United States Patent
Tognazzini

[19]

[11] Patent Number: 5,872,526
[45] Date of Patent: Feb. 16, 1999

[54] GPS COLLISION AVOIDANCE SYSTEM

[75] Inventor: Bruce Tognazzini, Woodside, Calif.

[73] Assignee: Sun Microsystems, Inc., Palo Alto, Calif.

[21] Appl. No.: 652,050

[22] Filed: May 23, 1996

[51] Int. Cl.$^6$ .................................................. G08G 5/04
[52] U.S. Cl. .......................... 340/961; 342/29; 701/301
[58] Field of Search ........................... 340/961; 364/461, 364/462, 439; 342/29, 30, 36; 701/301

[56] References Cited

U.S. PATENT DOCUMENTS

| | | | |
|---|---|---|---|
| 4,835,537 | 5/1989 | Manion | 340/961 |
| 4,914,436 | 4/1990 | Bateman et al. | 340/970 |
| 4,951,047 | 8/1990 | Paterson et al. | 340/970 |
| 5,111,400 | 5/1992 | Yoder | 364/439 |
| 5,153,836 | 10/1992 | Fraughton et al. | 340/961 |
| 5,181,027 | 1/1993 | Shafer | 340/961 |
| 5,325,302 | 6/1994 | Izidon et al. | 364/461 |
| 5,450,329 | 9/1995 | Tanner | 364/461 |
| 5,493,309 | 2/1996 | Bjornholt | 364/461 |
| 5,596,332 | 1/1997 | Coles et al. | 364/461 |
| 5,627,546 | 5/1997 | Crow | 364/439 |
| 5,636,123 | 6/1997 | Rich et al. | 364/461 |

*Primary Examiner*—Brent A. Swarthout
*Attorney, Agent, or Firm*—McDermott, Will & Emery

[57] ABSTRACT

A collision avoidance system for a plurality of vehicles equipped with GPS receivers, each broadcasting current location information to other vehicles and receiving and displaying location information from other vehicles, enables a vehicle operator to be aware of the location of the other vehicles. For vehicles not equipped with GPS, and transceivers, information about location is taken from common ground control equipment such as an FAA control station and broadcast to all vehicles. In an aircraft environment, flight plans can be filed and closed out automatically.

20 Claims, 9 Drawing Sheets

| AIRCRAFT 10 | LATITUDE | LONGITUDE | ELEVATION | TIME |
|---|---|---|---|---|
| . . . | | | | |
| N1532C | 37° 21' 30.51" N | 55° 17' 16.32" W | 4752 | 2152.0732Z |
| N1532C | 37° 21' 30.52" N | 55° 17' 16.33" W | 4800 | 2152.1007Z |
| . . . | | | | |

GPS COLLISION AVOIDANCE SYSTEM

BACKGROUND OF INVENTION

1. Field of the Invention

The present invention relates generally to collision avoidance systems. More particularly, the present invention provides an on-board traffic collision avoidance system, including a computer and programming instructions, which utilizes GPS position data to avoid collisions between vehicles. The invention is particularly useful in air traffic control.

2. Description of the Related Art

The global positioning system (GPS) is a constellation of twenty-four satellites that orbit the earth twice a day, transmitting precise time and positioning information to anywhere on the globe, twenty-four hours a day. The system was designed and deployed by the U.S. Department of Defense to provide continuous, worldwide position and a navigation data for the use of the United States and allied military forces. The potential for commercial applications of GPS were recognized early in the system's development and a determination made to allow free access to GPS signals with certain constraints applied.

Each GPS satellite broadcast two signals, PPS (Precise Positioning Service) and SPS (Standard Positioning Service). The PPS signal is an encrypted military-access code. The SPS is an unencrypted, spread-spectrum signal broadcast at 1,575.42 MHz. Unlike signals from Land-base navigation systems, the SPS signal is virtually resistant to multi-path and nighttime interference, it is unaffected by weather and electrical noise.

GPS receivers listen to signals from either three or four satellites at a time and triangulate a position fix using the interval between the transmission and reception of the satellite signal. Any particular receiver tracks more satellites than are actually needed for a position fix. The reason for this is that if one satellite becomes unavailable, the receiver knows exactly where to find the best possible replacement. Three satellites are required for two-dimension positioning (i.e. position only). Four satellites are required for three-dimension positioning (i.e. position and elevation). In general, an SPS receiver can provide position information with an error of less than twenty-five meters and velocity information with an error of less than five meters per second. A PPS receiver permits much greater accuracy. The higher accuracy is obtainable with the GPS make it suitable as a precision survey instrument.

Collision avoidance is a general problem in the operation of virtually any type of vehicle. The problem is particularly acute in the aviation industry. This is in part because of the significant number of both commercial and private aircraft and the fact that any collision between aircraft can result in a significant loss of life.

At present, general aviation pilots (i.e., private pilots) depend on air traffic controllers and their own observations to avoid collisions. Near misses occur regularly, even when the pilots are under FAA control.

Most commercial aircraft today are equipped with a collision avoidance system. However, such systems are often bulky and expensive to purchase and maintain. The systems do not utilize GPS data. It has been proposed to replace the current collision avoidance systems in commercial aircraft with a system which utilizes GPS data. The system proposed by the FAA would have information relating to the global position of aircraft in a particular vicinity transmitted to a centralized FAA control station by each aircraft within the vicinity and then retransmitted by the central control center to all other aircraft in the vicinity. The central FAA control concept facilitates the monitoring of a large number of aircraft over a very large area of perhaps 200 square miles or more. A centralized facility also facilitates the use of large, high-powered computers which can process large amounts of information quicker and perform more functions, such as making long-range predictions of potential problems, than on-board computers. However, a problem exists with the proposed system in that if the central control station has a failure or outage, the global position information relating to aircraft in the vicinity would not be received and hence could not be monitored or retransmitted.

Even if the FAA proposed system is implemented, it will not solve the problem of aircraft flying without their location transponders activated. In some cases, the aircraft crew has failed to turn on the transponder, while in other cases the transponder has been left in a standby state. After the aircraft has landed, there is an equally high incidence of transponders being left on.

The proposed FAA system does not deal with the problem of general aviation aircraft which may not have transponders.

Before beginning a flight, pilots may file a flight plan. Upon arrival, it is the pilot's responsibility to close the flight plan. A continuing problem, which again will not be solved by the FAA's proposed system, is that pilots fail to close out flight plans. When this occurs, a search mission may be unnecessarily begun after the scheduled arrival time, only to find the pilot safe in an airport coffee shop. Hence, the pilot's failure to promptly close the flight plan upon arrival can result in unnecessary expense and consternation.

SUMMARY OF THE INVENTION

Accordingly, it would be beneficial if a vehicle could receive positional information directly from other vehicles in the vicinity. It would also be desirable for each aircraft to receive positional information without reliance on a central FAA transmission facility. It would also be desirable if one could ensure that flight plans would be promptly opened and closed. It would also be desirable to have a low cost collision avoidance system readily available for general aviation use.

In accordance with the present invention, a collision avoidance system includes a receiver for receiving GPS signals representing the global position of a vehicle. A transceiver is also included for receiving, directly from other vehicles, signals representing a global position of the other vehicles and for transmitting signals representing the vehicle's global position directly to the other vehicles. A processor, such as a micro-processor operating in accordance with stored programming instructions, is provided to process the received GPS signals and the received signals representing the global positions of the other vehicles and to generate output signals indicative of the relative global positions of all the vehicles. Responsive to the output signals the relative positions of the vehicles can be displayed on an on-board monitor.

A vehicle receives global positioning information relating to other vehicles through direct communications with the other vehicles. No central station or relay is required. Although preferably all communications of information occur directly between the vehicles, it is possible that some of the other vehicles may not be capable of generating and/or transmitting the required signals. These vehicles may be detected on a central radar and their location transmitted to all equipped vehicles. It may also be advantageous for signals transmitted from all vehicles be processed and monitored at a central station to supplement or replace radar information, particularly during an outage.

If, for example, the system is being utilized in an air traffic control environment, each aircraft's transceiver may be capable of receiving signals from all other aircraft within a predetermined vicinity or range on the order of ten's or hundred's of miles. On the other hand, if the system is implemented for motor vehicle or boat traffic control, the coverage area may be limited to less than a mile.

The signals received by the transceiver from other vehicles, may also include information relating to the type, color and/or serial number of the other vehicles. In such cases the processor can generate output signals responsive to which the type, color and/or serial number as well as the global position of each other vehicle is displayed.

Preferably, the processor is configured to process signals representing the prior and current global position of the aircraft, derived from the received GPS signals, to determine the travel direction and speed of the vehicle. The travel direction and speed of the other vehicles is beneficially received with the other vehicle's global position information.

Signals representing the respective current global positions, travel directions and travel speeds of the vehicles are processed to determine the respective travel paths each vehicle. An output signal is generated by the processor if the vehicles are on a collision course or if they have or will enter each other's air space. The output signal may drive a beeper, flashing light, voice synthesizer and/or textual or pictorial display to warn an operator of the danger.

In an air traffic control implementation, the processor may be further configured to process signals representing the prior and current travel velocities of the aircraft to determine if there has been a change in the travel velocity which exceeds a threshold value. If, for example, the velocity has increased, the comparison may be against a threshold corresponding to the lift-off speed of the aircraft. In such a case, the processor generates a signal indicative of the aircraft performing a take-off procedure, responsive to which the transceiver may be automatically activated or have its frequency reset. On the other hand, if the velocity has decreased, the comparison may be against a threshold corresponding to the landing approach, touch-down or taxi speed of the aircraft. In this case, the processor generates a signal indicative of aircraft performing a landing procedure, responsive to which the transceiver may be automatically deactivated or have its frequency reset.

For an air traffic control implementation, the processor may be further configured to process signals representing the aircraft's global position and an airport location, such as the location of the airport destination designated in the flight plan, and to generate output signals indicative of the aircraft completing its flight plan if it is determined that the first aircraft is positioned to land at the destination airport. The flight plan may be automatically closed-out responsive to the generation of the output signals indicated by the performance of a landing procedure and the proper positioning for a landing or both.

The advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in the same or other fields, which are within the scope of the invention as disclosed and claimed herein and with respect to which the invention could be of significant utility.

BRIEF DESCRIPTION OF THE DRAWINGS

FIG. 4 is an exemplary data base in which information received from other aircraft is stored and which also stores information about the location of the aircraft in which the data base is resident.

NOTATIONS AND NOMENCLATURES

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
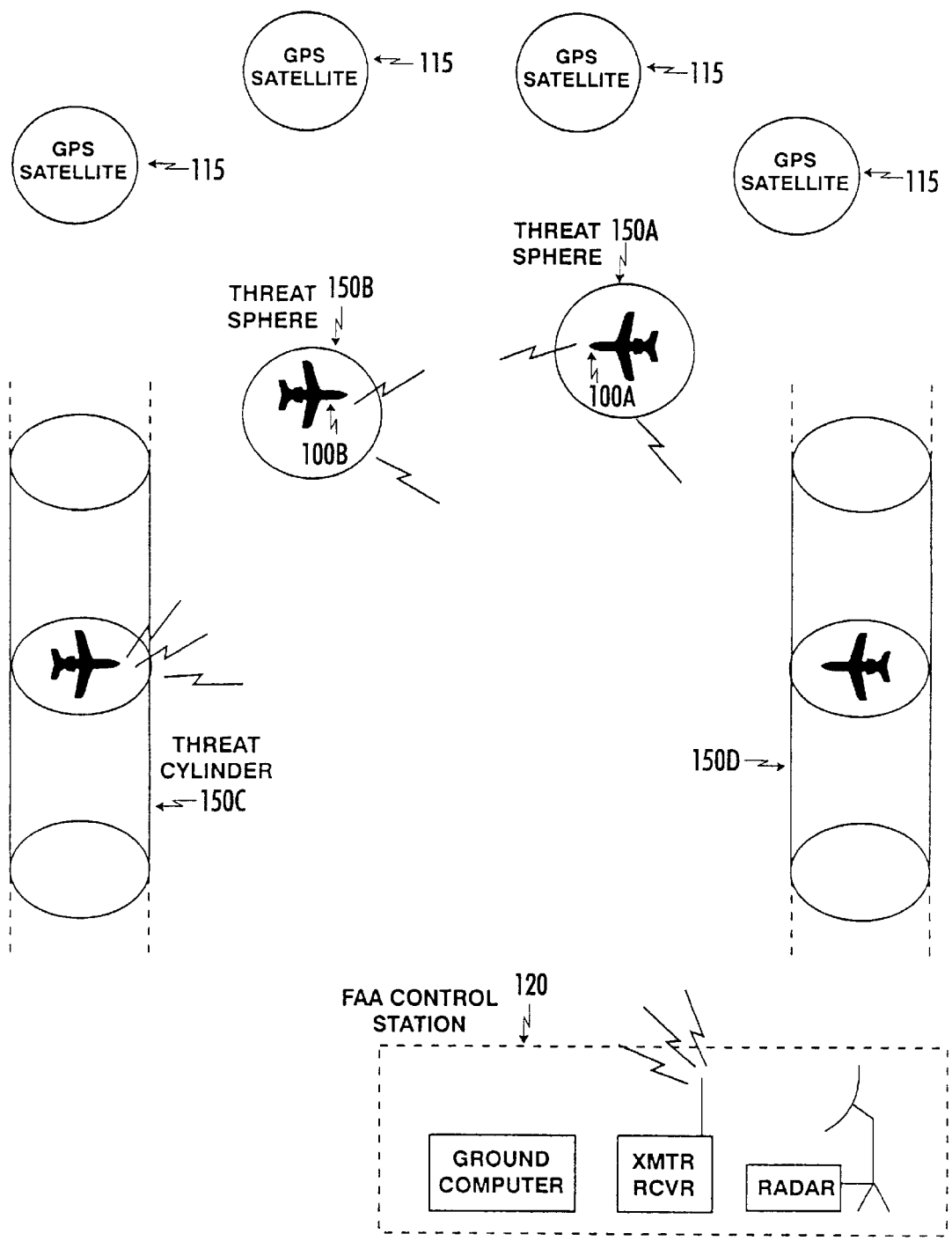
FIG. 1 is an exemplary depiction of various paths for communicating data and information between aircraft, and between an aircraft and an FAA control station, in accordance with the present invention.

FIG. 1 is an exemplary depiction of air traffic, satellites which form part of a global positioning system (GPS) and an air traffic control station.

As shown, aircraft 100*a*, 100*b*, 100*c* and 100*d* are in flight within a particular air space. Each aircraft 100*a*, 100*b* and 100*c* includes a location receiver such as a GPS receiver and a transmitter operatively attached to an antenna for communicating directly with other aircraft and/or the air traffic control (ATC) station 120. Preferably, the receiver and transmitter are provided as part of a location transceiver. Each aircraft 100*a*, 100*b* and 100*c* also includes a GPS receiver and antenna for receiving GPS signals from the GPS satellites 115. Aircraft 100*d* has neither GPS nor location transmitter/receiver nor operative transponder.

As indicated above, aircraft which are within a predefined range of each other communicate location information directly with each other via the transceiver. Additionally each aircraft 100*a*–100*c* can communicate directly with an ATC control station 120. As shown in FIG. 1, each of the aircraft 100*a*, 100*b* and 100*c* has a flight path and is surrounded by a threat boundary respectively designated 150*a*, 150*b* and 150*c*. As indicated, aircraft 100*a* and 100*b* are, depending on their respective velocities, potentially on a collision course.

Each of aircraft 100*a*, 100*b* and 100*c* is equipped with location transmitting and receiving equipment. Each of these aircraft monitors 4 GPS satellites which permits determining position in the X and Y direction as well as elevation (Z direction). Each of those aircraft transmits to other aircraft and to the FAA groundstation 120 at periodic intervals, the location information determined by the GPS receiver. Thus, each of aircrafts 100*a*, 100*b*, 100*c* and the FAA control station 120 are potentially aware of each of these aircraft positions, at least as they existed at one point in time. Normally, Air Traffic Control (ATC) radar will also provide information about the azimuth and distance of the aircraft from the radar station. However, the ATC station 120 obtains elevation information from transponders aboard the aircraft. Each of aircraft 100*a* and 100*b* is equipped with transponders which, if operating correctly, will provide the FAA with elevational information so that the position of these aircraft is completely determined. However, aircraft 150*c*, for purposes of this example, is assumed to have the transponder switched off. Additionally, aircraft 100*d* has an inoperative transponder and no other location providing information. Since the position of aircraft 100*a* and 100*b* is completely known, a threat sphere may be defined about the aircraft and a determination made whether the threat sphere of another aircraft intersects. With respect to aircrafts 100*c* and 100*d*, however, elevation information is not known, first, because the transponder in aircraft 100*c* is switched off and because the one in aircraft 100*d* is inoperative. Thus, the FAA control station 120 is only aware of the azimuth and radial distance of aircrafts 100*c* and 100*d* from the radar set. Elevation is unknown from the equipment available to the FAA. However, since aircraft 100*c* is equipped with GPS position detection equipment and with location transmitter receiver, the position of aircraft 100*c* is known, including elevation information, although the transponder is switched off. Each of the other aircraft in the area of aircraft 100*c* is also aware of 100*c*'s position because they also receive the information that the FAA control station 120 receives. However, aircraft 100*d* is not equipped with a GPS receiver nor with the ability to transmit location information. Thus, none of the aircraft in the vicinity of aircraft 100*d* are aware of its existence. However, the FAA control station 120 has aircraft 100*d* on its radar and knows azimuth and distance information for that aircraft. Thus, the FAA control station 120 is capable of transmitting to all aircraft at least the X and Y information about position of aircraft 100*d*. However, the elevation of aircraft 100*d* will not be known to any of the aircraft. Thus, for warning purposes, a threat cylinder 150*d* is constructed about aircraft 100*d*'s X and Y location so that potential collision information can be generated and appropriate warnings given.

Figure 2:
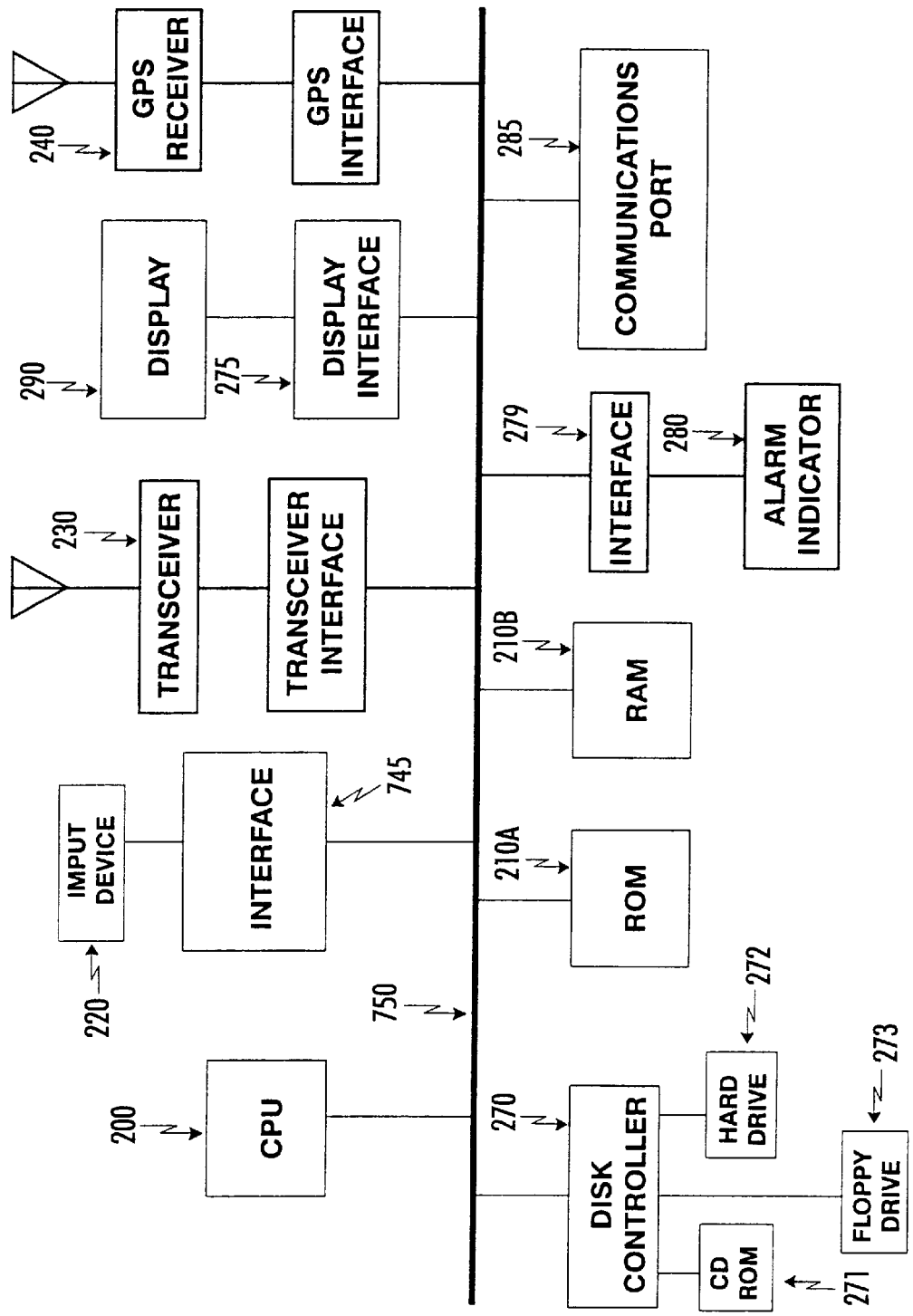
FIG. 2 is a block diagram of an on-board collision avoidance system in accordance with the present invention.

The collision avoidance system in accordance with the present invention will now be described with reference to FIG. 2. Each aircraft preferably includes a processing unit (CPU) 200. The CPU 200 is operatively connected to memory devices 210A and 210B, namely readonly memory (ROM) 210*a* and random access memory (RAM) 210*b*. ROM memory 210*a* typically stores BIOS and operating system like information. Programming which instructs the CPU 200 to operate in accordance with the present invention as will be described in detail below may be stored in ROM or RAM. Data and information received or generated by the CPU 200 can be preferably stored in RAM 210*b*. Memory devices such as hard or floppy disk 273, SRAM, DRAM, optical memory 271, etc., could be utilized in lieu of ROM and RAM memory depicted, as is well understood by those of skill in the art.

The CPU 200 is also operatively connected to input device 220 which could be a key pad, key board, dial or virtually any other device which would facilitate the input of data, of the type described below, to the CPU 200 by the crew of the aircraft. The CPU 200 is also operatively connected to a display device such as monitor 290 over display interface 275, although a printer or any other device capable of visually conveying information to the crew of the aircraft could be utilized.

The transceiver 230 allows communications to be transmitted to and received from other aircraft and the ATC station. The transceiver 230 is connected to one of antenna, as applicable, and to the CPU 200. A GPS receiver 240 is also operatively connected to CPU 200 and to one of GPS antennas 110*a*–110*c*, as applicable. An alarm indicator 280 is beneficially connected to the CPU 200. The alarm indicator 280 may be an audio, visual or audio/visual indicator. It may include a beeper, siren, light source and/or other aural or visual alarm indicator. In a more sophisticated version of the collision avoidance system of the invention, the alarm indicator 280 includes a voice synthesizer which is driven by the CPU 200 in accordance with the stored program instructions to generate synthesized voice signals.

The transceiver 230 and GPS receiver 240 could be disposed within a single housing, although this is not mandatory. In fact, it may be preferably for certain implementations to use separately housed, commercially available, off-the-shelf GPS receivers and transceivers.

Figure 3:
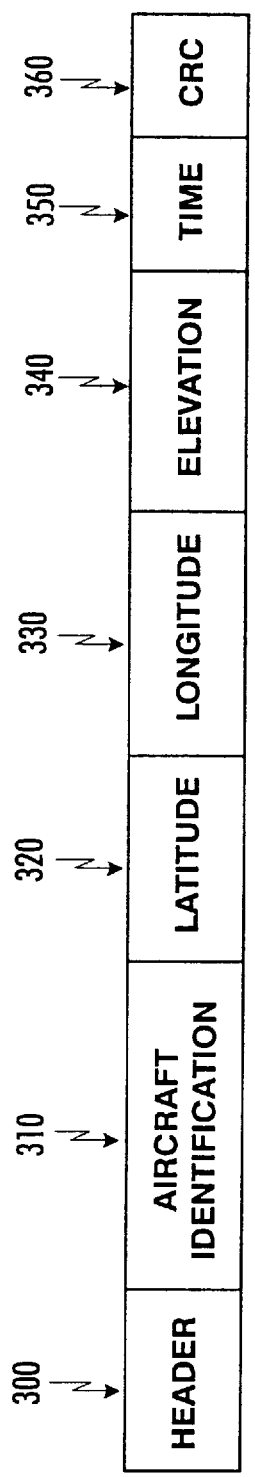
FIG. 3 is a representation of transmission protocol utilized for communication of location information among aircraft and groundstations.

FIG. 3 illustrates a communications protocol which can be utilized in accordance with the invention. Preferably, a self-organizing protocol such as carrier sense multiple access/collision detection (CSMA/CD) is utilized for the communication of information between stations. This is a packet oriented protocol utilizing a header 300 and a cyclic redundancy check (CRC) 360. In accordance with the invention, aircraft identification information is provided in the data portion of the packet as shown in block 310. This could typically include the full aircraft identification number, aircraft type, color, or any other information which might be useful in distinguishing aircraft from a pilot's perspective. The position of the aircraft in latitude (320) and longitude (330) is also included. Elevation information, assuming its available, is included. If it is not available, a wild card character may be substituted to indicate that the aircraft may be at any elevation. The time at which the position information (i.e. latitude 320, longitude 330 and elevation 340) is determined as also sent. In a heavy traffic situation, packet collisions may result in a short, but nevertheless significant time elapsing between the time at which position information was collected and the time at which it is transmitted to other aircraft, thus potentially providing outdated information. However, by including the time information in block 350, other stations will not be misled.

FIG. 4 illustrates a data base organization for information received from aircraft and from the FAA control station. Each record within the data base contains fields corresponding to fields 310, 320, 330, 340, and 350 of the communications protocol shown in FIG. 3. The last two digits of the item numbers shown in FIG. 4 correspond to the information from the communications protocol of FIG. 3.

As shown in FIG. 4, the position of aircraft N1532c changed between the times at which is was captured, shown at 450, by increasing in latitude by 0.01 seconds and by increasing in longitude, also by 0.1 seconds. During the interval between position information capture, the elevation changed from 4752 feet to 4800 feet. With the information given there, a velocity vector can be calculated, which, in the instance given, would show a heading of approximately northwest with the actual value of the velocity being calculated by the difference in latitude, longitude and elevational positions between the starting and end points divided by the difference between the times. Thus, utilizing the system in accordance with the invention, the position and velocity in three dimensions can be known for aircraft N1532c.

The data base would contain information on each aircraft equipped with GPS and location transmitting equipment within the receiving range of the aircraft.

As discussed above in conjunction with FIG. 1, for aircraft not so equipped, the FAA control station 120 would transmit azimuth and distance information but no elevation information. Communications from the FAA control station are received in the same format as other communications. The FAA control station would provide some type of aircraft identification number such as "Unknown-152", its latitude and longitude as derived from the radar information, an elevation wild card character and the time of the radar measurement. Thus, at least partial location information is available on each aircraft within the air space.

By adjusting the power of each location information transmitter, an effective range for communication of location information can be established. When an aircraft becomes too far away, the signal level of its packet transmissions will drop until noise corrupts the data packet. At that time, the CRC information will detect a corrupted packet and discard it. Eventually, the distance will become so far that the transmission will not be detected at all.

Figure 5:
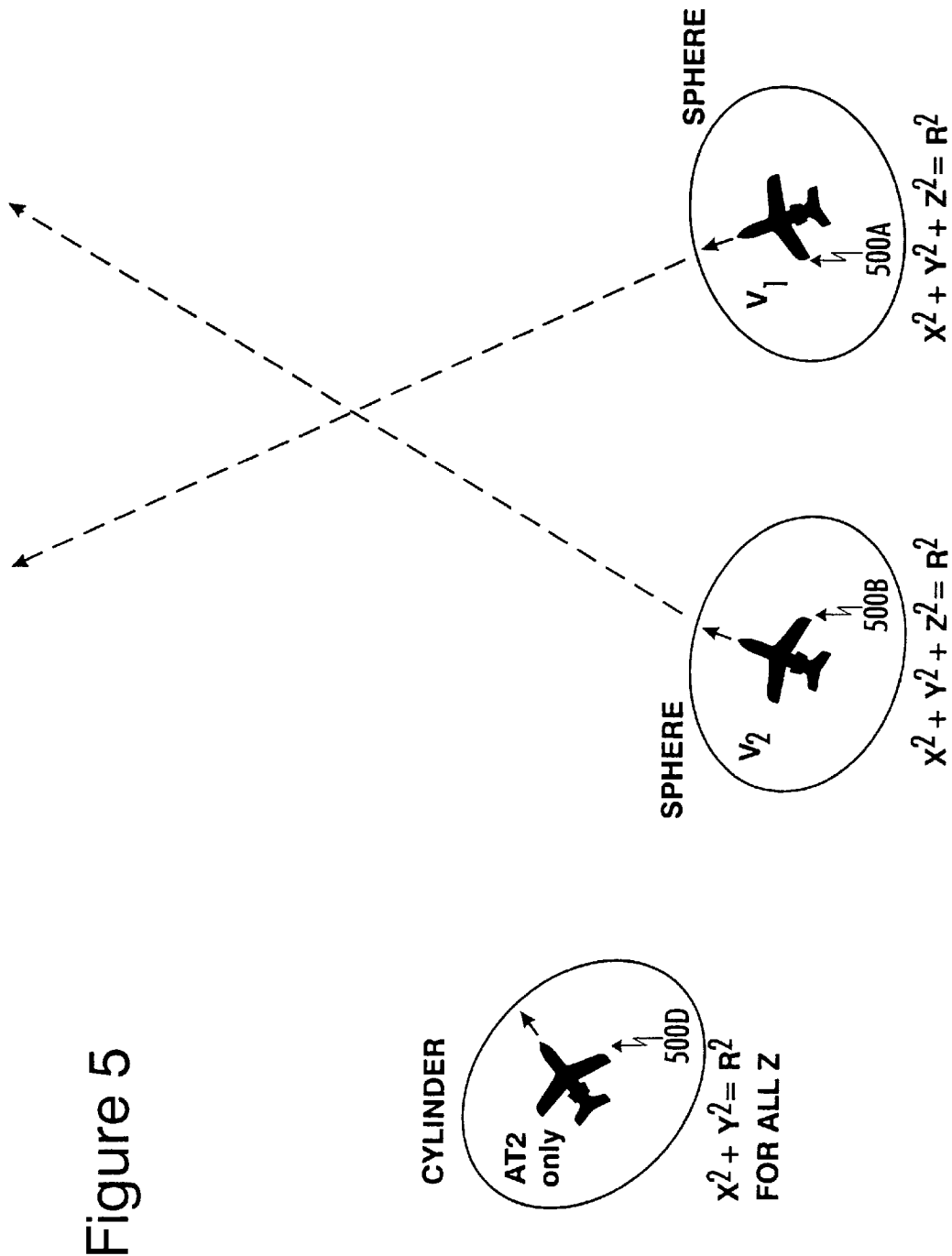
FIG. 5 illustrates three aircraft and threat boundaries utilized to determine possibility of collision.

FIG. 5 illustrates how the data base information can be utilized to avoid collisions. In FIG. 5, three aircraft are shown which correspond to aircraft 100*a*, 100*b* and 100*c* of FIG. 1. Since the position of aircraft 500*a* and 500*b* are known as a particular point in three dimensional space, that is, the elevation information is also known, a threat boundary can be defined about the aircraft in three dimensions. For example, a threat sphere could be constructed which, if the location information were known in X, Y and Z coordinates, would represent a sphere having the equation $X^2+Y^2+Z^2=R^2$, where R is the radius of the sphere. The location of aircraft 500*d*, which has neither GPS nor an operative transponder, is known only as to latitude and longitude, or X and Y coordinates but not as to the Z coordinate. A threat cylinder could be constructed about the X and Y location, the axis of which extends in the Z (elevational) direction. The formula for a cylinder is $X^2+Y^2=R^2$ for all values of Z. For each aircraft, a vector can be calculated showing the velocity in three dimensions of the aircraft. If a projection of the velocity vector, for example, of aircraft 500*b* intersects the threat sphere of aircraft 500*a* or the threat cylinder of aircraft 500*d*, a potential collision is detected and one level of warning would be appropriate. As the aircraft close yet further toward each other, when the threat boundary of one aircraft is penetrated by the threat boundary of another aircraft, an even more urgent warning is required. Finally, when the threat boundary of one aircraft intersects that of another and the projected velocity vectors intersect within a certain amount of uncertainty, a collision is imminent and a more drastic warning or affirmative evasive action needs to be undertaken.

One should note that each of the aircraft is located in relatively close proximity to the other aircraft and will likely each select the same set of satellites for position information calculation. Thus, an aircraft's own position determination will be subject to substantially the same errors introduced by the government as those received by other aircraft. If this assumption is not true, then the more precise PPS or differential GPS may be utilized with correction information be provided by the FAA station.

The operation of the collision avoidance system shown in the drawings will now be described with additional reference to FIGS. 3–5. Although preferably the system depicted in FIG. 2 is installed on each of the aircraft 100*a*–100*c*, each aircraft does not necessarily need to have an identical system. It should also be noted that, in the following discussion, the operational steps are described primarily from the perspective of aircraft 100*a*.

GPS receivers are readily available which integrate moving map information. Position information derived from satellites by the GPS receiver are used to retrieve the appropriate portion of a map to be displayed. Typically, moving maps contain a detailed data base of information about objects within a particular grid of the map. Such objects include street names, building names, address ranges, the location of any object such as an airport which might be significant from a navigation point of view.

Figure 10:
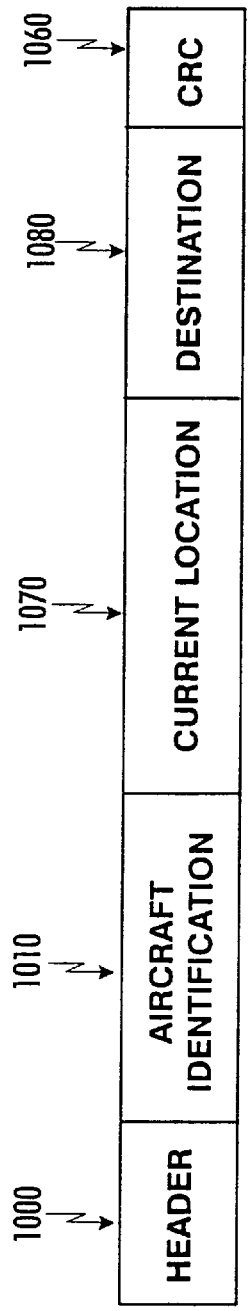
FIG. 10 is an exemplary transmission protocol utilized for filing flight plans and for closing them out.
Figure 6:
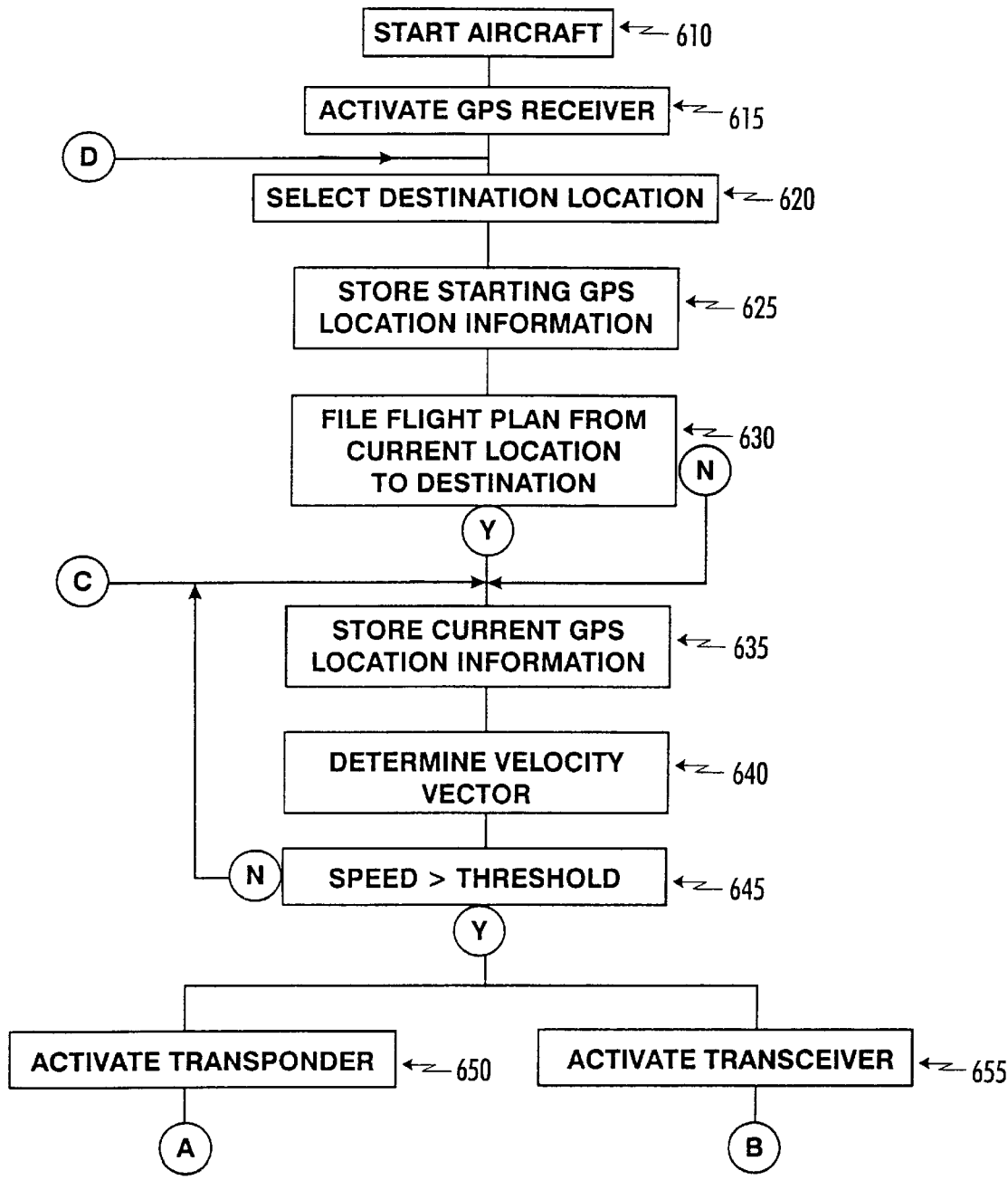
FIGS. 6, 7 and 8, together constitute a flowchart of the processes used to activate and deactivate transponders, to open and close flight plans and to avoid collisions in accordance with the invention.
Figure 7:
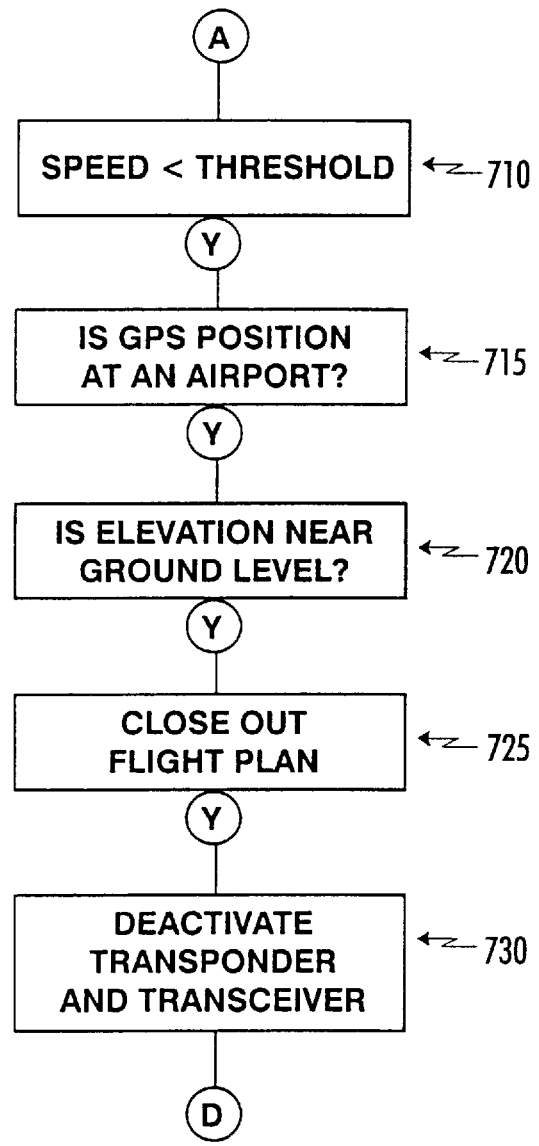
Figure 8:
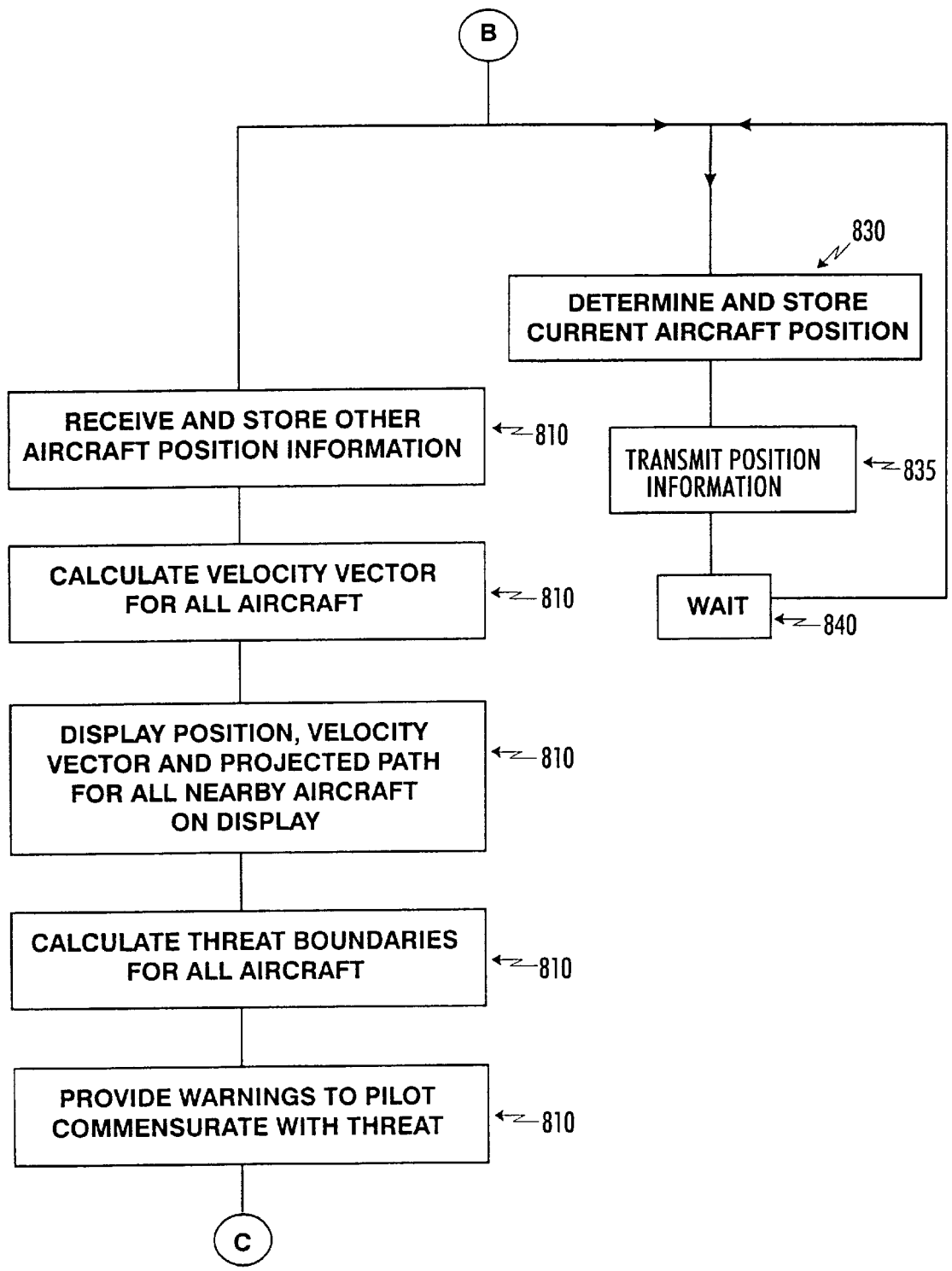

FIGS. 6, 7 and 8 represent a flow chart of processes used in accordance with the invention. In FIG. 6, the process begins with the starting of the aircraft at 610. Internal power is applied to all the systems at that time and the GPS receiver is activated (615). The pilot can select a destination location for the flight (620) and can store the GPS location information for the airport at which he is sitting (625). With the current location and the destination location specified, the pilot may automatically file a flight plan from the current location to the destination by performing the process described in conjunction with FIGS. 9 and 10. The filing of flight plan is optional, and if the option is declined (630-N) step 635 is performed. Step 635, 640 and 645 constitute a monitoring loop to get location information about the aircraft as a series of time-spaced samples so that velocity vectors may be determined between individual pairs of samples and the speed of the velocity vector utilized to determine, in step 645, whether some threshold is exceeded.

A speed threshold may be set to achieve different objectives. In one approach, the threshold is equivalent to the minimum speed required for the aircraft to take off. This option would be utilized if one wished to minimize communications traffic from planes that were situated on the ground. In another, the threshold might be some minimum speed to indicate the aircraft was moving whereby collision avoidance would be actuated for ground movement as well as air movement. For ground movement, it might be desirable to reduce the threat barrier in either size or dimensionality to be consistent with the needs of ground collision avoidance. If the aircraft speed does exceed whatever threshold is set, both the transponder would be activated (650) and the transceiver would be activated (655) to begin broadcasting location information to nearby aircraft. Once the transponder is activated at step 650, the process shown in FIG. 7 is undertaken.

FIG. 7 describes an automatic shut down process for both the transponder and the receiver and for the automatic closing out of a flight plan, normally at the end of a flight. At step 710, if the speed or change in speed is less than some threshold, which may or may not be the same as the activation threshold, a check is made to see if the GPS information indicates that the aircraft is located at an airport. If it is, a check is made to see if the elevation is near ground level. One could, optionally, determine whether the current GPS position indicates the same airport specified as the destination in the flight plan. If it does not, then an amended flight plan could be filed or the flight plan could be closed out automatically in anticipation that a new flight plan would be filed from the airport at which the aircraft is located. Once one of these options is selected, the transponder and the transceiver are both deactivated (730). Once they are deactivated, the process returns to continuation point D in FIG. 6 (just before block 620).

When the transceiver is activated (655) as shown in FIG. 6, the process shown in FIG. 8 begins. Essentially there are two parallel processes ongoing. In the first, beginning with block 830, the aircraft determines and stores its current position. It then transmits position information using the protocol described in FIG. 3. After a predetermined interval, 840, the process repeats so that, periodically, position information about the aircraft is transmitted to nearby aircraft and to the FAA ground station. This process continues until a transceiver is shut down. The other process running concurrently begins with block 810 in FIG. 8. Here the receiver portion of the transceiver receives and stores aircraft position information from other aircraft that are nearby. A velocity vector is calculated for all of these aircraft (815) and, preferably, a GPS moving map display displays the position, velocity vector, and projected path for all nearby aircraft. For each aircraft, threat boundaries are calculated (825) and appropriate warnings are provided to the pilot commensurate with the degree of threat. The degree of threat was discussed above.

Figure 9:
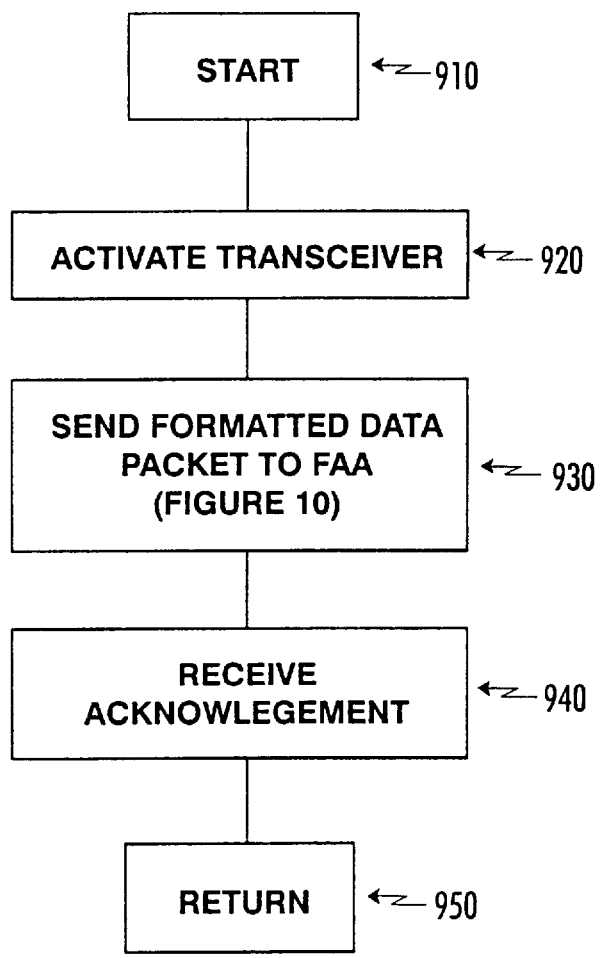
FIG. 9 is a flowchart of a process utilized for filing and closing out a flight plan.

Turning to FIG. 9, when the pilot desires to file a flight plan from his current location to a specified destination (630), the process shown in FIG. 9 is called (910). The transceiver is activated, even though it might otherwise be in an inactive condition (920) and a formatted data packet is sent to the FAA control station (930). The format of the data packet is described in conjunction with FIG. 10. The header 1000, the aircraft identification 1010 and CRC 1060 correspond to corresponding blocks in the transmission protocol shown in FIG. 3. The current location 1070 corresponds to blocks 320, 330 and optionally 340 of the protocol shown in FIG. 3. The destination location is formatted similarly to that of 1070.

When the aircraft receives acknowledgement from the FAA control station that the plan has been received and properly filed, the process returns.

Different alarms could be given depending on whether the aircraft 100a is on a collision course, or has entered or will enter another aircraft's air space. For example, if a voice synthesizer is utilized, different synthesized messages may give a clear indication of the type of potential problem and the urgency of corrective action. The warning may also be indicated on the monitor 290 if desired. It might additionally be beneficial for the CPU 200 to drive the transceiver 230 to issue a warning signal to the other aircraft. Advantageously, the warning might further indicate the type of corrective action which should be taken. For example, "veer right at 2 o'clock" or "reduce velocity to 300 knots". On the other hand, if a beeper or flashing light are utilized, the particular tone or intensity of the alarm may designate the type of potential problem. If the aircraft 100a and the other aircraft 100b and 100c appear to have non-conflicting flight paths, the collision avoidance system simply continues to monitor the position and flight path of the other aircraft.

As described, using the present invention, a vehicle can receive positional information directly from other vehicles with which it could potentially collide and without reliance on a central transmission facility. In an air traffic implementation, each aircraft can receive positional information regarding other aircraft in its vicinity without the need of a central control station. A vehicle operator is automatically warned of an impending collision and notified of identifying characteristics of a vehicle with which it may collide if corrective action is not taken. The transceiver for exchanging collision avoidance information with other vehicles can be automatically activated and deactivated. Additionally, the flight plan can be automatically closed when the aircraft has successfully completed its flight.

It will also be recognized by those skilled in the art that, while the invention has been described above in terms of preferred embodiments it is not limited thereto. Various features and aspects of the above described invention may be used individually or jointly. Further, although the invention has been described in the context of its use in a air traffic collision avoidance, those skilled in the art will recognize that the present invention can be beneficially utilized in virtually any collision avoidance application. Accordingly, the claims set forth below should be construed in view of the full breath and spirit of the invention as disclosed herein.

What is claimed:

1. A collision avoidance system, comprising:
   a receiver configured to receive first vehicle position vehicle; information signals representing a global position of a first
   a transceiver, activated when velocity of said first vehicle exceeds a threshold, configured to receive directly from a second vehicle, second vehicle information signals representing a global position of the second vehicle; and a processor configured to process signals representing the global position of the first vehicle and the global position of second vehicle, and to generate output signals indicative of relative global positions of the first and the second vehicles.

2. A system according to claim 1, wherein responsive to said generated output signals the relative global positions of said first and said second vehicles are displayed.

3. A system according to claim 1, wherein:
the transceiver is configured to, receive directly from the second vehicle, second vehicle identification information signals representing at least one of a type, a color and a serial number of the second vehicle;
said generated output signals are indicative of at least one of the type, the color and the serial number of the second vehicle; and
responsive to said generated output signals at least one of the type, the color and the serial number is displayed.

4. A system according to claim 1, wherein:
said vehicles are aircraft;
said global position of the first vehicle is a current global position of the first vehicle;
said second vehicle information signals represent a travel direction and a travel speed of the second vehicle; and
said processor is configured to process signals representing a prior global position and the current global position of the first vehicle to determine a travel direction and a travel speed of the first vehicle, and to process signals representing the current global position, the travel direction and the travel speed of the first vehicle and the global position, the travel speed and the travel speed of the second vehicle to determine if the vehicles are on a collision course.

5. A system according to claim 1, wherein:
said first vehicle is an aircraft;
said receiver is configured to receive first vehicle changed position signals representing a changed global position of the first vehicle;
said processor is configured to process signals representing the global position and the changed global position of the first vehicle to determine a travel speed of the first vehicle, to process signals representing the travel speed of the first vehicle to determine if a threshold is exceeded, and to generate a signal indicative of said first aircraft performing a landing procedure or a take-off procedure if said threshold is exceeded.

6. A system according to claim 1, wherein:
said first vehicle is an aircraft;
said processor is configured to process signals representing the first vehicle global position and an airport location and to generate output signals indicative of the first aircraft completing a flight plan if it is determined that the first aircraft is positioned to land at said airport.

7. A system according to claim 1, wherein said transceiver is configured to transmit a signal representing the global position of the first vehicle directly to the second vehicle.

8. A method for avoiding vehicle collision, comprising the steps of:
receiving first vehicle position information signals representing a global position of a first vehicle;
receiving, directly from a second vehicle, second vehicle information signals representing a global position of a second vehicle when first vehicle velocity exceeds a threshold; and
processing signals representing the global position of the first vehicle and the global position of the second vehicle to determine relative positions of the first and the second vehicles.

9. A method according to claim 8, wherein said second vehicle information signals represent a travel speed and a travel direction of the second vehicle, and further comprising the steps of:
processing signals representing the global position of a first vehicle to determine a travel speed and a travel direction of the first vehicle; and
processing signals representing the travel speed and the travel direction of the first vehicle and the travel speed and the travel direction of the second vehicle to determine respective travel paths of said first and said second vehicles.

10. A method according to claim 8, further comprising the steps of:
generating output signals indicative of the relative positions of the first and the second vehicles; and
displaying the relative positions of said first and said second vehicles responsive to said output signals.

11. A method according to claim 8, further comprising the steps of:
receiving, directly from the second vehicle, second vehicle identification information signals representing at least one of a type, a color and a serial number of the second vehicle; and
generating output signals indicative of the relative positions of the first and the second vehicles and at least one of the type, the color and the serial number of the second vehicle.

12. A method according to claim 11, wherein said vehicles are aircraft and further comprising the steps of:
determining a change in velocity of the first vehicle;
determining if the change in velocity exceeds a threshold value; and
generating an output signal indicative of the first aircraft performing a landing procedure or a take-off procedure if the change in velocity exceeds the threshold value.

13. A method according to claim 12, further comprising the steps of:
processing signals representing the global position of the first aircraft and a global position of an airport to determine if the first aircraft is positioned to land at said airport; and
generating the output signal indicative of the first aircraft completing the flight plan only if the first aircraft is positioned to land at said airport.

14. A method according to claim 8, further comprising the step of transmitting a signal representing the global position of the first vehicle from the first vehicle directly to the second vehicle.

15. An article of manufacture for avoiding vehicle collisions, comprising:
computer readable storage medium; and
computer programming stored on said storage medium;
wherein said stored computer programming is configured to be readable from said computer readable storage medium by a computer disposed on-board a first vehicle and thereby cause said on-board computer to operate so as to:
compute a global position of the first vehicle from received first vehicle position information signals;
identify a global position of a second vehicle from second vehicle information signals received directly from the second vehicle when velocity of said first vehicle exceeds a threshold; and compare the first vehicle global position with the second vehicle global position to determine relative positions of the first and the second vehicles.

16. An article of manufacture according to claim 15, wherein said stored computer programming is configured to be readable from said computer readable storage medium by the on-board computer to thereby cause said on-board computer to operate so as to:

determine a travel velocity of the first vehicle;

identify a travel velocity of the second vehicle from the second vehicle information signals;

process signals representing the travel velocity of the first vehicle to determine a travel path of said first vehicle;

process signals representing the travel velocity of the second vehicle to determine a travel path of said second vehicle;

compare the travel paths of said first and said second vehicles to determine if the vehicles are on a collision course; and generate an output signal if the respective travel paths of the first and the second vehicles intersect to warn an operator of the first vehicle that the vehicles are on a collision course.

17. An article of manufacture according to claim 15, wherein said stored computer programming is configured to be readable from said computer readable storage medium by the on-board computer to thereby cause said on-board computer to operate so as to:

generate an output signal indicative of the relative positions of the first and the second vehicles; and wherein responsive to said output signal the relative positions of said first and said second vehicles are displayed.

18. An article of manufacture according to claim 15, wherein said stored computer programming is configured to be readable from said computer readable storage medium by the on-board computer to thereby cause said on-board computer to operate so as to:

identify at least one of a type, a color and a serial number of the second vehicle from said second vehicle identification information signals;

generate an output signal indicative of at least one of the type, the color and the serial number of the second vehicle;

determine a change in velocity of the first vehicle;

determine if the change in velocity exceeds a threshold value; and generate an output signal indicative of the first aircraft completing a flight plan only if the change in velocity of the first aircraft exceeds the threshold value.

19. A programmed computer for vehicle collision avoidance, comprising:

a processor disposed on-board a first vehicle configured to (i) process first vehicle information signals to identify a global position of the first vehicle, (ii) process second vehicle information signals transmitted directly between the first vehicle and a second vehicle to identify a global position of the second vehicle when the first vehicle velocity exceeds a threshold, and (iii) compare the first vehicle global position with the second vehicle global position to determine relative positions of the first and the second vehicles; and storage medium configured to store information corresponding to the first vehicle global position.

20. A programmed computer according to claim 19, wherein:

said processor is configured to process the first vehicle information signals to determine a flight path of said first vehicle and the second vehicle information signals to determine a flight path of said first vehicle, and to compare the flight paths of said first and said second vehicles to determine if the vehicles are on a collision course; and said storage medium is configured to store information corresponding to the second vehicle global position.

* * * * *

UNITED STATES PATENT AND TRADEMARK OFFICE
CERTIFICATE OF CORRECTION

PATENT NO. : 5,872,526
DATED : February 16, 1999
INVENTOR(S) : Bruce TOGNAZZINI

It is certified that error appears in the above-identified patent and that said Letters Patent is hereby corrected as shown below:

Claim 1, Line 62, after "first" insert --vehicle;--

Signed and Sealed this

First Day of June, 1999

Attest:

Attesting Officer

Q. TODD DICKINSON

Acting Commissioner of Patents and Trademarks